US012658771B2

(12) United States Patent
Margraf et al.

(10) Patent No.: US 12,658,771 B2
(45) Date of Patent: Jun. 16, 2026

(54) ARRANGEMENT FOR GROUNDING A SHAFT

(71) Applicant: ZF Friedrichshafen AG, Friedrichshafen (DE)

(72) Inventors: Christoph Margraf, Markdorf (DE); Michael Griesbach, Tettnang (DE); Daniel Ortner, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 219 days.

(21) Appl. No.: 18/410,289

(22) Filed: Jan. 11, 2024

(65) Prior Publication Data

US 2024/0235337 A1      Jul. 11, 2024

(30) Foreign Application Priority Data

Jan. 11, 2023    (DE) .......................... 102023200152.7

(51) Int. Cl.
| | |
|---|---|
| *H02K 11/40* | (2016.01) |
| *B60R 16/06* | (2006.01) |
| *F16C 41/00* | (2006.01) |
| *H02K 7/00* | (2006.01) |
| *F16C 3/02* | (2006.01) |

(52) U.S. Cl.
CPC .............. *H02K 11/40* (2016.01); *B60R 16/06* (2013.01); *F16C 41/002* (2013.01); *H02K 7/003* (2013.01); *F16C 3/02* (2013.01)

(58) Field of Classification Search
CPC ....... H02K 11/40; H02K 7/003; F16C 41/002; F16C 3/02; B60R 16/06
See application file for complete search history.

(56) References Cited

FOREIGN PATENT DOCUMENTS

| | | |
|---|---|---|
| CN | 114400835 A | 4/2022 |
| DE | 10 2019 133 677 A1 | 6/2021 |

OTHER PUBLICATIONS

German Search Report for Application No. 102023200152.7 dated Mar. 13, 2024.

*Primary Examiner* — Terrance L Kenerly
(74) *Attorney, Agent, or Firm* — Dority & Manning, P.A.

(57) ABSTRACT

An arrangement (13) for grounding a shaft, in particular an input shaft (2) of a transmission (3), includes a grounding hub (16) via which the shaft to be grounded is electrically conductively connected to a ground, preferably a housing (9). The ground forms a guide bore (25) in which the grounding hub (16) is axially movably guided. The shaft to be grounded is configured as a hollow shaft at least in the region of one axial end (14). In order to ground the shaft, the guide bore (25) is formed on a rod-shaped section (26), by which the ground is guided from the axial end (14) of the shaft to be grounded radially inward and axially into the shaft to be grounded. The guide bore (25) axially overlaps the shaft.

20 Claims, 8 Drawing Sheets

ARRANGEMENT FOR GROUNDING A SHAFT

CROSS-REFERENCE TO RELATED APPLICATION

The present application is related and has right of priority to German Patent Application No. DE102023200152.7 filed on Jan. 11, 2023, which is incorporated by reference in its entirety for all purposes.

TECHNICAL FIELD

The invention relates generally to an arrangement for grounding a shaft, in particular an input shaft of a transmission or a rotor shaft of an electric machine. The invention also relates generally to a transmission, an electric axle drive unit for a motor vehicle, and to an electric machine, in each of which an aforementioned arrangement is provided.

BACKGROUND

In the field of motor vehicles, electric machines are used to design the motor vehicle as a hybrid vehicle or an electric vehicle. Electric machines are also provided in some motor vehicle transmissions in order to make the motor vehicle transmission suitable for use in a hybrid vehicle or an electric vehicle. Whereas the remaining components of the transmission are enclosed and shielded by the surrounding transmission housing, the shafts guided out of the transmission housing can induce electromagnetic interference, which, in the area of a motor vehicle, can result in a malfunction of other electronic components. In addition, a potential difference can build up between the shaft and the transmission housing, which can result in perforations on bearings of the shaft and thus to a reduction in the service life of these bearings. For this reason, the shaft concerned is to be grounded, if possible. A shaft is also to be grounded with respect to other electric machines provided in a motor vehicle, such as, for example, electric axle drive units, in order to eliminate or reduce electromagnetic interference and to prevent the build-up of a potential difference. Grounding is usually carried out by electrically conductively connecting the shaft to be grounded to a ground, which is usually a housing.

DE 10 2019 133 677 A1 describes an arrangement for grounding a rotor shaft of an electric machine, wherein the rotor shaft in this arrangement is electrically conductively connected via a tubular grounding hub to a housing, which acts as ground for grounding the rotor shaft. The grounding hub is supported at one axial end on the rotor shaft via a support bearing and is floatingly mounted at an opposite axial end in a housing cover of the housing. For the floating mounting, the housing cover forms a guide bore, wherein an electrically conductive, radially spring-loaded intermediate element is provided in this guide bore radially between the grounding hub and the housing cover. This intermediate element, as a conductor element, also establishes the electrically conductive connection between the grounding hub and the housing. The guide bore in the housing cover is axially adjacent to one axial end of a transmission shaft which is connected to the rotor shaft for conjoint rotation and is grounded together therewith via the grounding hub. For the purpose of connecting the grounding hub to the rotor shaft, the transmission shaft is designed as a hollow shaft, through which the grounding hub is guided radially inward. On the rotor shaft side, an electrically conductive connection between the grounding hub and the rotor shaft is established as a sliding contact via a contact element, which is in the form of a carbon pin. The carbon pin is mounted on the rotor shaft and guided in a carbon brush holder, which is mounted on the grounding hub. Due to sliding contact between the carbon pin and the carbon brush holder, the electrically conductive connection is established between the grounding hub and the rotor shaft.

BRIEF SUMMARY

Example aspects of the present invention provide an arrangement in which a grounding of a shaft is achieved in a compact manner.

According to example aspects of the invention, an arrangement for grounding a shaft includes a grounding hub, via which the shaft to be grounded is electrically conductively connected to a ground, preferably a housing. The ground forms a guide bore, in which the grounding hub is axially movably guided. The shaft to be grounded is designed as a hollow shaft at least in the region of one axial end.

A "shaft" as set forth in example aspects of the invention should be understood, in principle, as a rotatable component which is provided for transmitting a rotational motion between components to be coupled. This shaft can also be integral with one or both component(s) to be coupled. It is particularly preferred when the shaft to be grounded is a shaft of a transmission, this shaft then being, in particular, an input shaft of the transmission. It is particularly preferred when this shaft of the transmission is also connected within the transmission to a rotor shaft, which is provided for a corotational connection with a rotor of an electric machine of the transmission and is grounded in the arrangement together with the shaft of the transmission. The rotor of the electric machine and this rotor shaft can also be formed as one piece or can be present as individual components which are separate and connected to each other for conjoint rotation. The shaft to be grounded can also directly be a rotor shaft of an electric machine, however.

In the arrangement according to example aspects of the invention, the grounding hub is provided for electrically conductively connecting the shaft to be grounded to the ground, in that the grounding hub is electrically conductively connected to the shaft to be grounded and also electrically conductively connected to the ground. The grounding hub includes an electrically conductive material at least in contact regions with the ground and the shaft to be grounded and in an intermediate region connecting the contact regions. Preferably, the grounding hub is formed entirely of an electrically conductive material, however, which is, in particular, a metal material, such as, for example, steel or aluminum.

The grounding hub as set forth in example aspects of the invention has, in particular, a rod-like shape, i.e., the grounding hub is designed as an elongate component, similarly to a shaft, in order to establish the electrically conductive connection preferably axially between the shaft to be grounded and the ground within the arrangement according to example aspects of the invention. It is further preferred when the grounding hub is rotationally symmetrical.

The ground, with which the electrically conductive connection of the shaft to be grounded is established via the intermediate grounding hub, is, as set forth in example aspects of the invention, an electrically conductive body, to which, in particular, the potential zero is assigned as reference potential. Preferably, this ground is present in the form of a housing. The electrically conductive connection of the grounding hub can be specifically established at this housing, a housing part, or a component which is permanently electrically connected thereto. It is particularly preferred when the grounding hub establishes an electrically conductive connection of the shaft to be grounded with a housing cover of the housing.

Within the scope of the invention, "axial" means an orientation towards an axis of rotation of the shaft to be grounded or of a longitudinal axis of the grounding hub, whereas "radial" means an orientation in the diameter direction from the axis of rotation of the shaft to be grounded or from the longitudinal axis of the grounding hub.

As set forth in example aspects of the invention, an "electrically conductive" connection should be understood as a connection in which a current flow is made possible between the connected components. With respect to the arrangement according to example aspects of the invention, this electrically conductive connection is formed between the ground and the grounding hub, and between the grounding hub and the shaft to be grounded, wherein this can be implemented directly or indirectly via further, intermediate components. Therefore, the grounding hub can be electrically conductively connected to a further shaft within the arrangement according to example aspects of the invention, the further shaft being electrically conductively connected to the shaft to be grounded.

Due to the axially movable guidance of the grounding hub in the guide bore formed on the ground side, a floating mounting of the grounding hub on the ground is achieved. In particular, a guide section is defined on the grounding hub side, at which guide section the axially movable guidance of the grounding hub in the guide bore is carried out. It is particularly preferred when the axially movable guidance is achieved with an outer diameter of the guide section of the grounding hub on an inner diameter of the guide bore.

Example aspects of the invention provide that the guide bore is formed at a rod-shaped section, by which the ground is guided from the axial end radially inward and axially into the shaft to be grounded. The guide bore axially overlaps the shaft. In other words, the axially movable guidance of the grounding hub is therefore carried out axially in overlap with the shaft to be grounded, in that the guide bore is arranged radially inward with respect to the shaft and axially overlapping the shaft. For this purpose, the guide bore is provided at a rod-shaped section, which projects axially into the shaft from the axial end at which the shaft to be grounded is designed at least as a hollow shaft.

This type of example embodiment of an arrangement for grounding a shaft has the advantage that the axially floating mounting of the grounding hub on the ground is therefore brought into axial overlap with the shaft to be grounded, as a result of which axial space required for grounding the shaft is shortened. As a result, the grounding of the shaft is achieved in a compact manner. Since an electrically conductive connection of the shaft to be grounded with the ground is established via the grounding hub, the grounding of the shaft can be achieved in a reliable way.

However, in the arrangement according to DE 10 2019 133 677 A1, the guide bore, in which the grounding hub is axially floatingly mounted, is formed in the housing cover lying axially next to the transmission shaft. Corresponding axial installation space is necessary due to this arrangement axially next to one another.

As set forth in the invention, an "axial overlap" of the guide bore with the shaft should be understood to mean that the guide bore and the shaft axially overlap. The guide bore can be provided completely axially at the level of the shaft to be grounded or overlap with the shaft only via a subsection. In particular, the guide bore can axially overlap with a bearing point, via which the shaft to be grounded is rotatably mounted on the ground side.

The section forming the guide bore is "rod-shaped," which should be understood as set forth in example aspects of the invention to mean that the section on the ground side is designed as an offset, protruding part, in order to be axially guidable into the shaft, which is designed as a hollow shaft at least in this region.

According to one example embodiment of the invention, a spring element is provided, which axially preloads the grounding hub towards a contact at which the grounding hub is electrically conductively connected to the shaft to be grounded. The spring element is supported on the ground side, this being carried out, in particular, on a collar, which is formed on the rod-shaped section. Advantageously, an axial preload of the grounding hub towards the contact, at which the grounding hub is electrically conductively connected with the shaft to be grounded, can be achieved via the spring element, thereby ensuring that this electrically conductive connection is always maintained. Within the scope of example aspects of the invention, the spring element can be designed as a helical spring, as a wave spring, as a disk spring, or the like.

The collar, against which the spring element is supported in particular on the ground side, is preferably circumferential as set forth in example aspects of the invention and forms an axially oriented abutment surface for the spring element. Alternatively to support against a collar designed on the rod-shaped section, the spring element can also be supported against an end face of a screw plug, which has been screwed into the housing or a housing cover of the housing and is used to close an opening via which the grounding hub is inserted. The preload via the spring element is also built up as this screw plug is screwed into the thread.

In one example development of the aforementioned example embodiment, the spring element electrically conductively connects the grounding hub to the ground. As a result, the spring element, in addition to axially preloading the grounding hub towards the contact, also performs the function of electrically connecting the grounding hub with the ground. In particular when the spring element is designed as a wave spring, an axial electrical contact can be established with a low contact length and thus also with low contact resistance.

Alternatively or in addition to the aforementioned example development, the spring element is supported against an abutment surface on the grounding hub side. As a result, the spring element can also be axially supported in a reliable way on the grounding hub side. Preferably, the abutment surface is defined on an end face of the grounding hub at one axial end of the grounding hub, this abutment surface further preferably being formed by a circumferential, radially inward projecting section of the grounding hub. Advantageously, as a result, the abutment surface for the spring element can be realized in a simple manner.

In another example embodiment of the invention, the grounding hub has a radially outward projecting section which, in interaction with a ground-side stop in each case, limits an axial displacement of the grounding hub with respect to the ground in at least one axial direction. Advantageously, as a result, an axial movement of the grounding hub with respect to the ground in the corresponding direction can be limited, as a result of which, in combination with the use of a spring element to limit the axial movement towards this spring element, excessive compression of the spring element can be prevented. In this context, this ground-side stop should be understood as an installation stop. In addition, an axial limitation of the spring deflection of the spring element is preferably implemented via a bearing or a support bearing, wherein an electrically conductive connection is established here between the grounding hub and the shaft to be grounded.

A limitation of the axial movement of the grounding hub in the opposite direction, specifically towards a contact of the grounding hub with the shaft to be grounded, can be advantageous for an installation of the arrangement according example aspects of to the invention, however, in that the grounding hub is axially fixed within the scope of the installation prior to the establishment of the contact with the shaft to be grounded.

In a combination of the aforementioned example embodiment with the example variant of the invention, in which the spring element is supported against an abutment surface on the grounding hub side, the radially outward projecting section forms the abutment surface for the contact with the spring element. As a result, due to the radially outward projecting section of the grounding hub, an axial stop can be defined on the grounding hub side and, additionally, the abutment surface for supporting the spring element can be realized. The spring element is therefore positioned radially surrounding the grounding hub and is therefore arranged on a larger diameter. If the grounding hub is also tubular at least in sections and is used to supply a lubricant and/or coolant, the spring element is not acted upon by a pressure of the lubricant and/or coolant, due to the radially surrounding position of the grounding hub.

In one example development of the aforementioned example embodiment, the one stop in each case is formed by an abutment shoulder of the ground and/or by a snap ring. The snap ring is placed in a corresponding groove particularly preferably on the ground side and is therefore axially fixed on the ground. In both cases, a stop can be realized in a simple way.

Alternatively or in addition to the aforementioned example development, an axial displacement of the grounding hub with respect to the ground towards a contact of the grounding hub with the shaft to be grounded is limited due to the interaction of the section with the snap ring, whereas a limitation in an opposite axial displacement direction of the grounding hub is formed by interaction of the section with the abutment shoulder. In this case, therefore, axial displacements of the grounding hub are limited in both directions, wherein this is achieved in one axial direction due to the interaction of the section with a snap ring and in the other axial direction due to the interaction of the section with an abutment shoulder. As set forth in example aspects of the present invention, the snap ring therefore has the function of an installation stop in this case, wherein no contact with the grounding hub is established during operation.

According to one advantageous example design option of the invention, the grounding hub is secured against rotation on the ground side by at least one ridge which projects radially and extends in the circumferential direction over a subsection, is formed on the grounding hub or on the ground, and projects into a recess in each case, each recess being delimited on both sides of the ridge in the circumferential direction and formed in the ground or on the grounding hub. As a result, it is ensured that the grounding hub does not rotate with respect to the ground, which would otherwise make it more difficult to establish electrical contact. This is the case because relative rotation would have to be made possible otherwise in a region between the grounding hub and the ground. A rotation prevention mechanism can be easily realized via the at least one ridge.

According to one example embodiment of the invention, the grounding hub is of a multi-part design, wherein the axial guidance of the grounding hub is carried out on a first part of the grounding hub, which is electrically conductively connected to the ground and to which a second part is connected. The second part establishes the electrically conductive connection of the first part with the shaft to be grounded. Advantageously, as a result, manufacture of the grounding hub and, if necessary, the installation thereof as well, can be simplified, in that the individual parts are installed and connected to each other one after the other, if necessary. A connection of the individual parts of the grounding hub can be carried out, for example, by welding, riveting, pressing, or the like. In particular, the individual parts can be easily produced within the scope of a shaping process.

In the combination of the aforementioned example embodiment with the preceding example design option, the ridge projects radially outward on the first part of the grounding hub. As a result, the ridge can be easily realized within the scope of manufacture of the first part, for example, by shaping.

In one example development of the invention, an O-ring is accommodated at the rod-shaped section, the O-ring having contact with the grounding hub. Mounting of the grounding hub on the ground can be secured via the O-ring. This O-ring can be accommodated in a circumferential groove of the rod-shaped section or directly placed on an inner diameter of the rod-shaped section.

In one example embodiment of the invention, the grounding hub is tubular at least in sections and, via an internal volume, connects a supply connection for lubricant and/or coolant on the ground side to the shaft to be grounded. As a result, in addition to establishing the electrically conductive connection between the shaft to be grounded and the ground, the grounding hub also performs the function of supplying lubricant and/or coolant to the shaft to be grounded, for the purpose of which the grounding hub is tubular at least in sections.

The lubricant and/or coolant can be guided via an internal volume of the grounding hub, which is formed tubular at least in sections, and a resultant defined supply line to the shaft to be grounded. The lubricant and/or coolant is preferably oil, which is provided for cooling the shaft. The grounding hub is tubular at least over a portion of its axial extension, in that, in the at least partial tubular subsection of the grounding hub, an internal volume is delimited by the surrounding material of the grounding hub and thus the supply line is defined in this region. Particularly preferably, however, the grounding hub is designed entirely as a tube, in order to therefore enable the lubricant and/or coolant to be supplied via the entire axial extension of the grounding hub and thus also to achieve guidance of the lubricant and/or coolant from the one axial end of the grounding hub to the other axial end. This example embodiment is combined, in particular, with the development of example aspects of the invention, in which the grounding hub is permanently secured against rotation, since, as a result, a flow of the lubricant and/or coolant via the grounding hub is simplified because the grounding hub does not rotate.

In one example development of the aforementioned example embodiment, the internal volume of the grounding hub is connected to a radial outer region of the grounding hub via at least one bore. As a result, a portion of the lubricant and/or coolant conducted via the internal volume can also be directed into the radial outer region of the grounding hub, in order to also supply other components in addition to the shaft to be grounded, such as, for example, bearings and/or gears, etc. It is particularly preferred when the at least one bore is provided axially adjacently to an inner ring of a bearing, via which the shaft to be grounded is mounted for rotation with respect to the grounding hub. Furthermore, the at least one bore lies vertically below, in particular in the installed position of the grounding hub, in order to allow a portion of the lubricant and/or coolant to easily flow out via the at least one bore.

According to one example embodiment of the invention, the grounding hub has a diameter reduction, on which a bearing having an inner ring is positioned. As a result, a projection and thus also an abutment shoulder are defined on the grounding hub side, via which abutment shoulder an axial force introduced via a spring element into the grounding hub can be transmitted onto the inner ring of the bearing. This diameter reduction, in combination with the aforementioned example embodiment, in which the grounding hub is provided for supplying lubricant and/or coolant to the shaft to be grounded, can also be used to change the flow cross-section and thus to adjust the amount of lubricant and/or coolant conducted to the shaft. Alternatively or additionally, a sleeve can be provided in the grounding hub on the side of the shaft to be grounded in the region of a mouth of the interior space of the grounding hub, via which sleeve the flow cross-section can also be changed and thus the amount of lubricant and/or coolant can also be adjusted.

In one example development of this example embodiment, the bearing forms a contact, via which the grounding hub is electrically conductively connected to the shaft to be grounded. In this case, the electrically conductive connection is therefore established between the grounding hub and the shaft to be grounded via the intermediate bearing, as a result of which a separate connecting element can be eliminated. This is the case because the bearing can be positioned on a small diameter between the grounding hub and the shaft to be grounded, as a result of which low peripheral speeds arise at the bearing. Due to these low peripheral speeds, an insulating effect of lubricant of the bearing, which otherwise increases as the speed increases, is avoided, which could otherwise make the electrically conductive connection via the bearing more difficult. Within the scope of the invention, the electrically conductive connection can be established between the grounding hub and the shaft to be grounded equally well via a separate contact element, such as, for example, in the form of a carbon brush.

According to a further design example option of the invention, the rod-shaped section is formed on a housing cover, which is secured on the housing which forms the ground. As a result, the arrangement can be easily installed by preferably initially arranging the grounding hub on the housing cover and preventing it from drifting via an appropriate axial stop, the cover including the grounding hub subsequently being connected to the rest of the housing within the scope of a further installation step and thereby establishing the electrical contact of the grounding hub with the shaft to be grounded.

Example aspects of the invention also relate to a transmission, which is, in particular, a motor vehicle transmission. In this transmission, at least one shaft is grounded in an arrangement according to one or more of the aforementioned example variants. This arrangement can be realized, in particular with respect to a transmission shaft, in the form of an input shaft of the transmission or a rotor shaft of an electric machine which is integrated into the transmission. An arrangement according to example aspects of the invention for grounding the shaft can also be an integral part of an electric drive axle unit for a motor vehicle or of an electric machine.

BRIEF DESCRIPTION OF THE DRAWINGS

Advantageous example embodiments of the invention, which are explained in the following, are shown in the drawings, in which.

DETAILED DESCRIPTION

Figure 1:
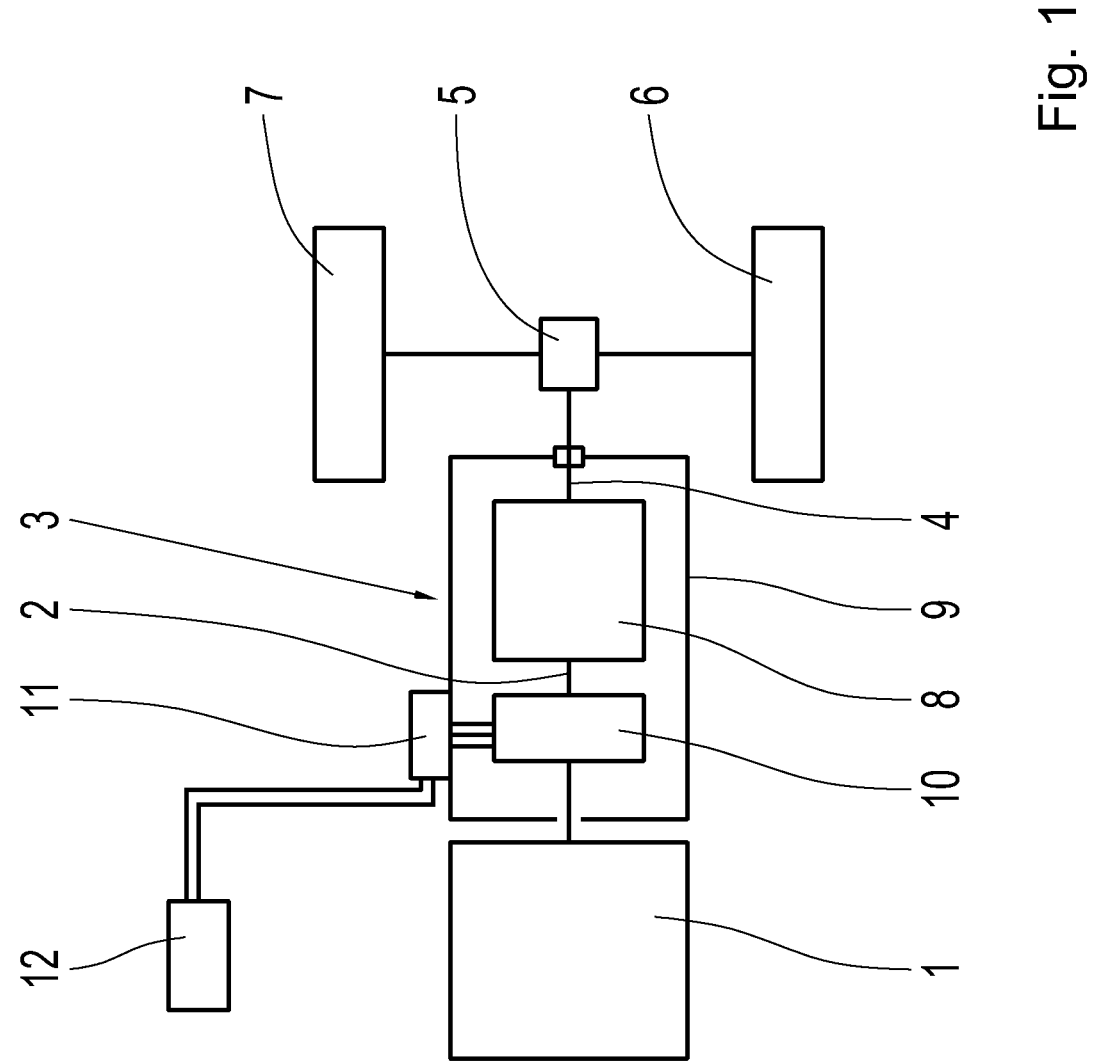
FIG. 1 shows a schematic view of a drive train of a motor vehicle.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a schematic view of a drive train for a motor vehicle. This drive train includes an internal combustion engine 1, the output of which is connected to an input shaft 2 of a transmission 3. An output shaft 4 of the transmission 3 is connected to a differential gear 5. The differential gear 5 is designed to distribute the power applied at the output shaft 4 to driving wheels 6 and 7 of the motor vehicle. The transmission 3 has a gear set 8 which, together with shift elements (not shown in FIG. 1), is designed to provide various transmission ratios between the input shaft 2 and the output shaft 4. The gear set 8 is enclosed in a housing 9 which also accommodates an electric machine 10, which is connected to the input shaft 2. The electric machine 10 is designed to drive the input shaft 2. A power inverter 11 is mounted on the housing 9. The power inverter 11 is connected on one side to the electric machine 10 and to a battery 12 on the other side. The power inverter 11 is utilized for converting the direct current of the battery 12 into an alternating current, which is suitable for operating the electric machine 11, and includes several power semiconductors for this purpose. The conversion between direct current and alternating current takes place by a pulse-like operation of the power semiconductors controlled by an open-loop system.

Figure 2:
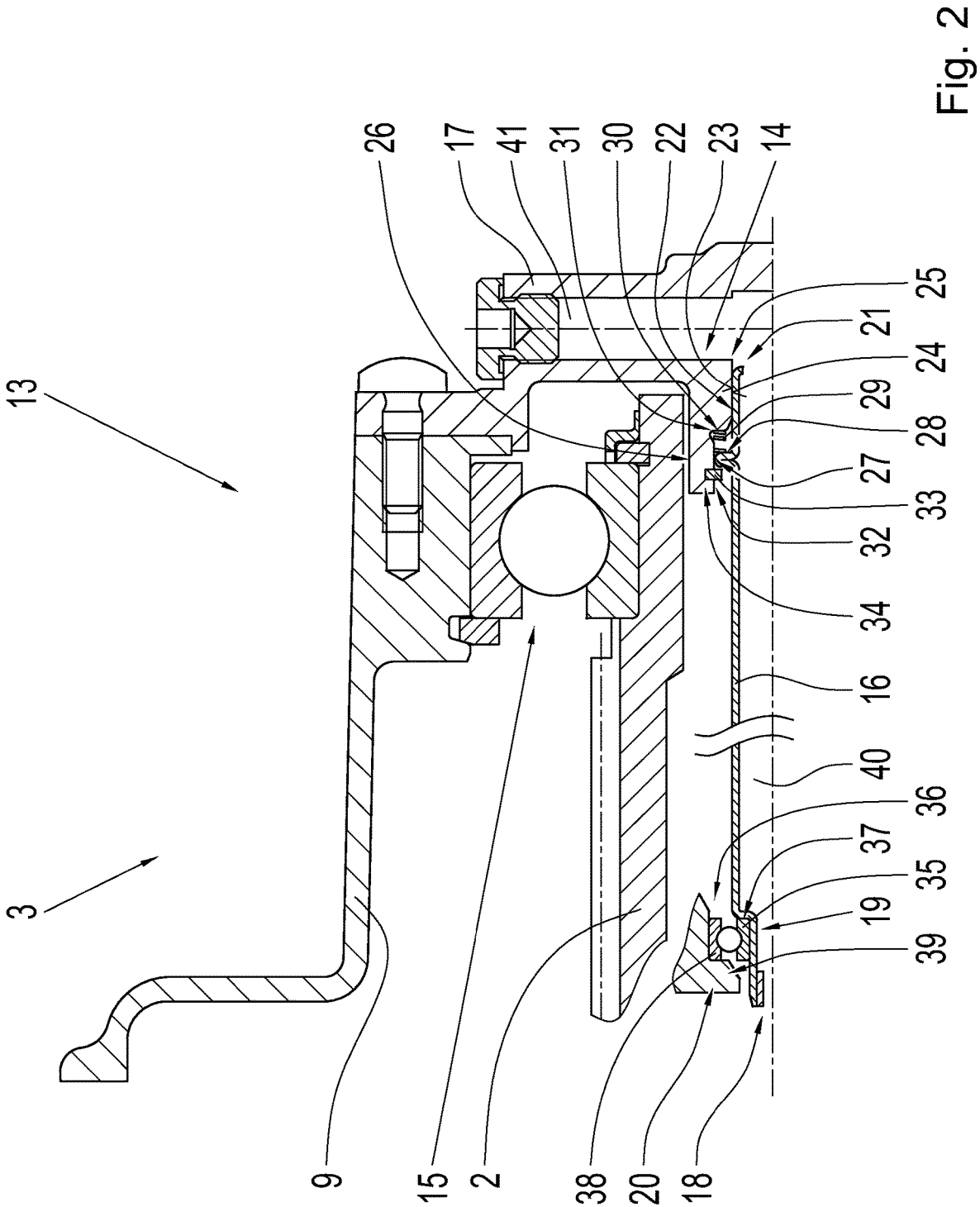
FIG. 2 shows a sectional view of a transmission of the drive train from FIG. 1 in the region of an arrangement according to example aspects of the invention, according to a first example embodiment of the invention.

The input shaft 2 is grounded in an arrangement 13, which is shown in FIG. 2, in order to prevent electromagnetic interference and the build-up of a potential difference during operation. FIG. 2 shows the transmission 3 in the region of an axial end 14 of the input shaft 2, at which the input shaft 2 is rotatably mounted in the housing 9 via a bearing 15. The input shaft 2 is designed as a hollow shaft at least in the region shown in FIG. 2. The bearing 15 is a roller bearing in the form of a grooved ball bearing. The arrangement 13 is designed according to a first example embodiment of the invention and includes a grounding hub 16, which electrically conductively connects the input shaft 2 to be grounded to a housing cover 17 of the housing 9, the housing 9 acting as ground for grounding the input shaft 2. The housing cover is screwed to the rest of the housing 9, screw connections lying radially external to the input shaft 2 and axially at the level of the input shaft 2.

As is apparent in FIG. 2 in particular, the grounding hub 16 is tubular and extends axially from the housing cover 17 radially inward with respect to the input shaft 2, the grounding hub 16 extending radially inward with respect to the input shaft 2. The grounding hub 16 is made of an electrically conductive material, which is preferably metal. A bearing 19 is positioned on the grounding hub 16 in the region of one axial end 18 of the grounding hub 16. Via this bearing 19, the input shaft 2 is mounted for rotation with respect to the permanently stationary grounding hub 16. Apart therefrom, the bearing 19, which is in the form of a roller bearing, also makes electrical contact 20 of the input shaft 2 with the grounding hub 16, such that the electrically conductive connection between the input shaft 2 to be grounded and the grounding hub 16 is therefore established via the intermediate bearing 19.

On an axial end 21 lying opposite the axial end 18, the grounding hub 16 is additionally axially movably guided by the housing cover 17, this guidance taking place at a guide section 22 in which the grounding hub 16 is guided with an outer diameter 23 in an inner diameter 24 of a guide bore 25 in the housing cover 17. In order to now produce the arrangement 13 in the most compact manner possible, the guide bore 25 in the housing cover 17 is provided at a section 26 which is configured in the shape of a rod and with which the housing cover 17 is guided from the axial end 14 of the input shaft 2 radially inward with respect to the input shaft 2 and axially into the input shaft 2. The guide bore 25 axially overlaps the input shaft 2, as a result of which the axial guidance of the grounding hub 16 extends at least primarily axially within the input shaft 2.

In addition, a circumferential section 27 is formed on the grounding hub 16 axially adjacently to the guide section 22. The circumferential section 27 projects radially outwards with respect to the guide section 22. This section 27 defines an abutment surface 28 for a spring element 29, which, on the abutment surface 28 side and also on the housing cover 17 side, is supported against an abutment shoulder 30, which is formed on the section 26 axially adjacent to the guide bore 25. The spring element 29 is designed as a wave spring in the present case, which axially preloads the grounding hub 16 against the bearing 19, thereby ensuring an appropriate axial preload of the bearing 19 for achieving low-noise operation and additionally ensuring that the contact 20 between the grounding hub 16 and the input shaft 2 is maintained.

The spring element 29 is also used, however, to establish electrically conductive contact of the grounding hub 16 with the housing cover 17 of the housing 9, in order to always maintain the electrically conductive connection between the grounding hub 16 and the housing cover 17 in this case as well. Due to the design of the spring element 29 as a wave spring, this electrical contact can be established with a short line path and thus with low contact resistance.

The section 27 of the grounding hub 16 also acts to limit an axial relative displacement of the grounding hub 16 with respect to the housing cover 17 in both axial directions, in that an axial displacement of the grounding hub 16 in the guide bore 25 towards the spring element 29 is limited due to the interaction of the section 27 with a first axial stop 31, in order to prevent excessive compression of the spring element 29. However, an opposite axial displacement of the grounding hub 16 with respect to the housing cover 17 in the guide bore 25, specifically towards the bearing 19, is limited due to the interaction of the section 27 with an axial stop 32. This is advantageous in particular for installation of the arrangement 13, in order to be able to pre-install the grounding hub 16 and the spring element 29 in the housing cover 17. The axial stop 31 is formed by the abutment shoulder 30, whereas the axial stop 32 is formed by a snap ring 33, which is placed in a groove 34 in the housing cover 18.

As is also apparent in FIG. 2, an inner ring 35 of the bearing 19, which is designed as a grooved ball bearing, is placed on a diameter reduction 36 of the grounding hub 16. The diameter reduction 36 defines an abutment shoulder 37, via which the axial force introduced into the grounding hub 16 via the spring element 29 is transmitted onto the inner ring 35 of the bearing 19. In addition, an outer ring 38 of the bearing 19 is supported against a projection 39 on the input shaft 2.

Apart from establishing the electrically conductive connection between the input shaft 2 to be grounded and the housing cover 17, the grounding hub 16 is also used to supply lubricant and/or coolant to the input shaft 2 to be grounded, in order to cool the input shaft 2 here and, in particular, the rotor of the electric machine 10 of the transmission 3. The lubricant and/or coolant is preferably oil. The lubricant and/or coolant is introduced from the axial end 21 into an internal volume 40 of the grounding hub 16, in that a supply connection 41 for the lubricant and/or coolant extends on the end face of the grounding hub 16 at the axial end 21. The internal volume 40 is connected to the supply connection 41. Along the grounding hub 16, the lubricant and/or coolant, which has been introduced into the internal volume 40, then arrives at the axial end 18. The diameter reduction 36 allows for a reduction of the flow cross-section and thus an adjustment of the amount of lubricant and/or coolant. At the axial end 18 of the grounding hub 16, the lubricant and/or coolant can then enter the inner region of the input shaft 2 to be grounded.

In order to install the arrangement 13 from FIG. 2, the grounding hub 16 is initially inserted into the guide bore 25 in the housing cover 17. The spring element 29 is positioned axially between the abutment shoulder 30 and the abutment surface 28. The snap ring 33 is then placed in the groove 34 in order to prevent the grounding hub 16 from being pushed out of the guide bore 25 via the spring element 29. The housing cover 17, including the grounding hub 16 and the spring element 29, is then mounted on the housing 9, with the section 26 being axially inserted into the input shaft 2.

Figure 3:
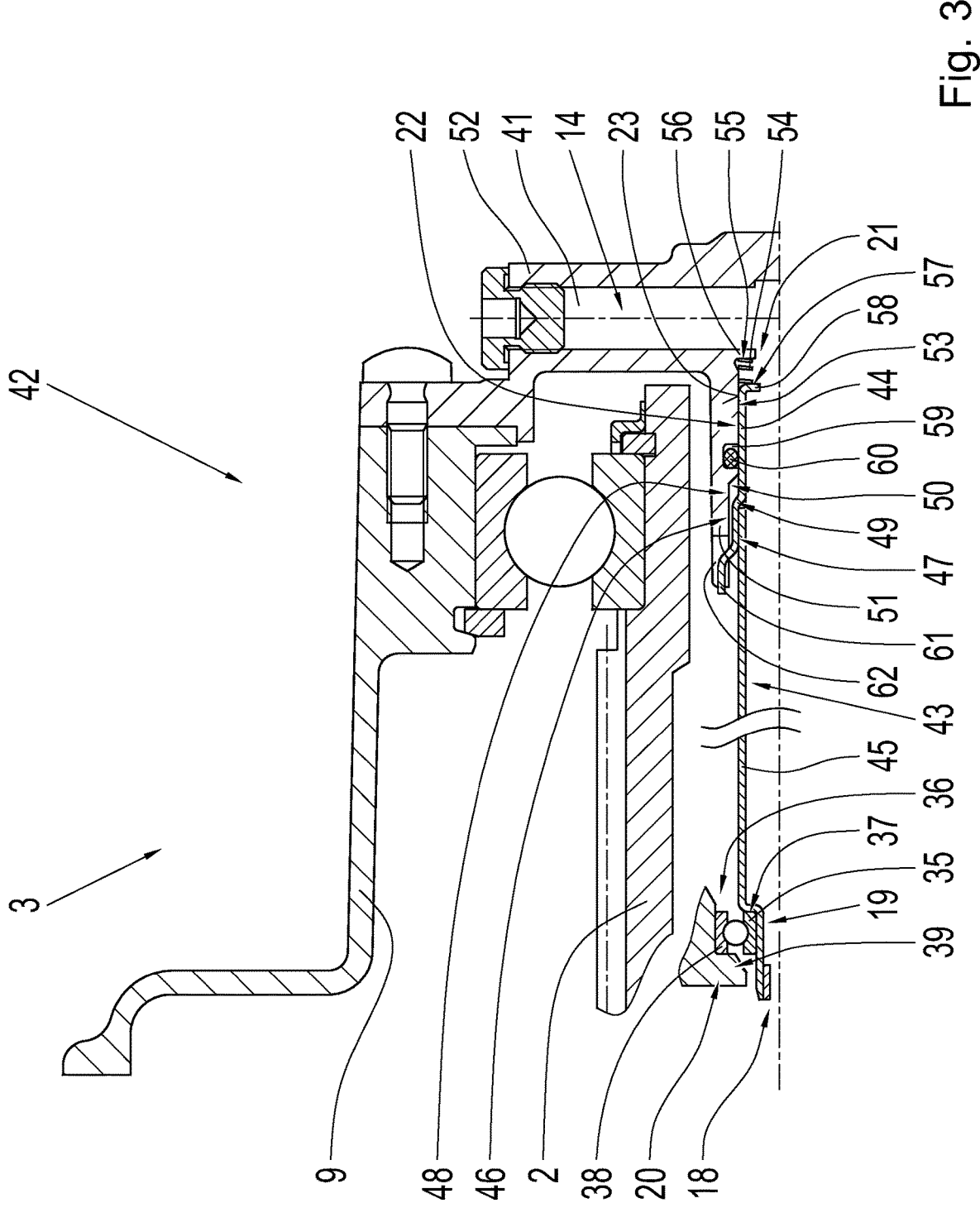
FIG. 3 shows a sectional view of an arrangement according to example aspects of the invention, according to a second example design option of the invention.

FIG. 3 furthermore shows a sectional view of an arrangement 42, which can be used alternatively to the example variant from FIG. 2 for grounding the input shaft 2. This arrangement 42 is produced according to a second example design option of the invention and largely corresponds to the example variant according to FIG. 2. The difference, however, is that a grounding hub 43 of the arrangement 42 is now of a multi-part design, in that the grounding hub 43 is composed of a first part 44 and a second part 45. The first part 44 of the grounding hub 43 is produced, in particular, as a deep-drawn part and forms the guide section 22 of the grounding hub 43 on an outer diameter 23. The outer diameter 23 transitions towards the second part 45 into a larger outer diameter 46, via which a connection section 47 is defined. At this connection section 47, the first part 44 is connected to the second part 45, which is situated radially inward with respect thereto. This connection is established, in particular by a press-fit connection, although the connection can be established equally well by riveting or welding.

Due to the widening of the first part 44 from the outer diameter 23 onto the outer diameter 46, a projection 48 and thus also an abutment surface 49 is defined by the first part 44 of the grounding hub 43. The abutment surface 49, in interaction with an abutment shoulder 50, limits an axial displacement of the grounding hub 43 in this direction. The abutment shoulder 50 is formed at a section 51 of a housing cover 52 which, similarly to the example variant according to FIG. 2, is screwed to the housing 9 and establishes an electrically conductive connection of the grounding hub 43 to the housing 9 and thus also to the ground. Similarly as well to the example embodiment according to FIG. 2, the section 51 is formed on the housing cover 52 in the shape of a rod and is axially inserted into the input shaft 2 radially inward with respect thereto, in order to form a guide bore 53 for the axial guidance of the grounding hub 43 on the guide section 22.

In the example design option according to FIG. 3 as well, the grounding hub 43 is axially preloaded towards the bearing 19, this preload being implemented via a spring element 54, which is formed as a wave spring again and axially electrically conductively contacts the grounding hub 43 with the housing cover 52. On the housing cover 52 side, the spring element 54 is supported against an abutment surface 55, which is formed by a radially inward projecting, circumferential collar 56. On the grounding hub 43 side, the spring element 54 is supported against an abutment surface 57, which is defined on the end face of the grounding hub 43 at the axial end 21 of the grounding hub 43. Specifically, the abutment surface 57 is formed by a collar 58, which is formed circumferentially on the axial end 21 and projects radially inward with respect to the guide section 22.

In the region of the guide bore 53, a circumferential groove 59 is additionally introduced in the section 51. An O-ring 60 is placed in the groove 59. This O-ring 60 rests against the outer diameter 23 of the guide section 22 and acts as a mounting securing mechanism. In addition, in contrast to the example variant from to FIG. 2, a ridge 61 is provided, which is provided in a radially projecting manner on the first part 44 side. The ridge 61 extends axially and axially follows the connection section 47 on a side facing away from the guide section 22. The ridge 61 on the section 51 side is enclosed in a recess 62, which is delimited on both sides of the ridge 61 in the circumferential direction. As a result, a rotation prevention mechanism of the grounding hub 43 is realized via the first part 44 on the housing cover 52. For the rest, the example embodiment according to FIG. 3 corresponds to the example variant according to FIG. 2, and so reference is made to the description thereof.

Figure 4:
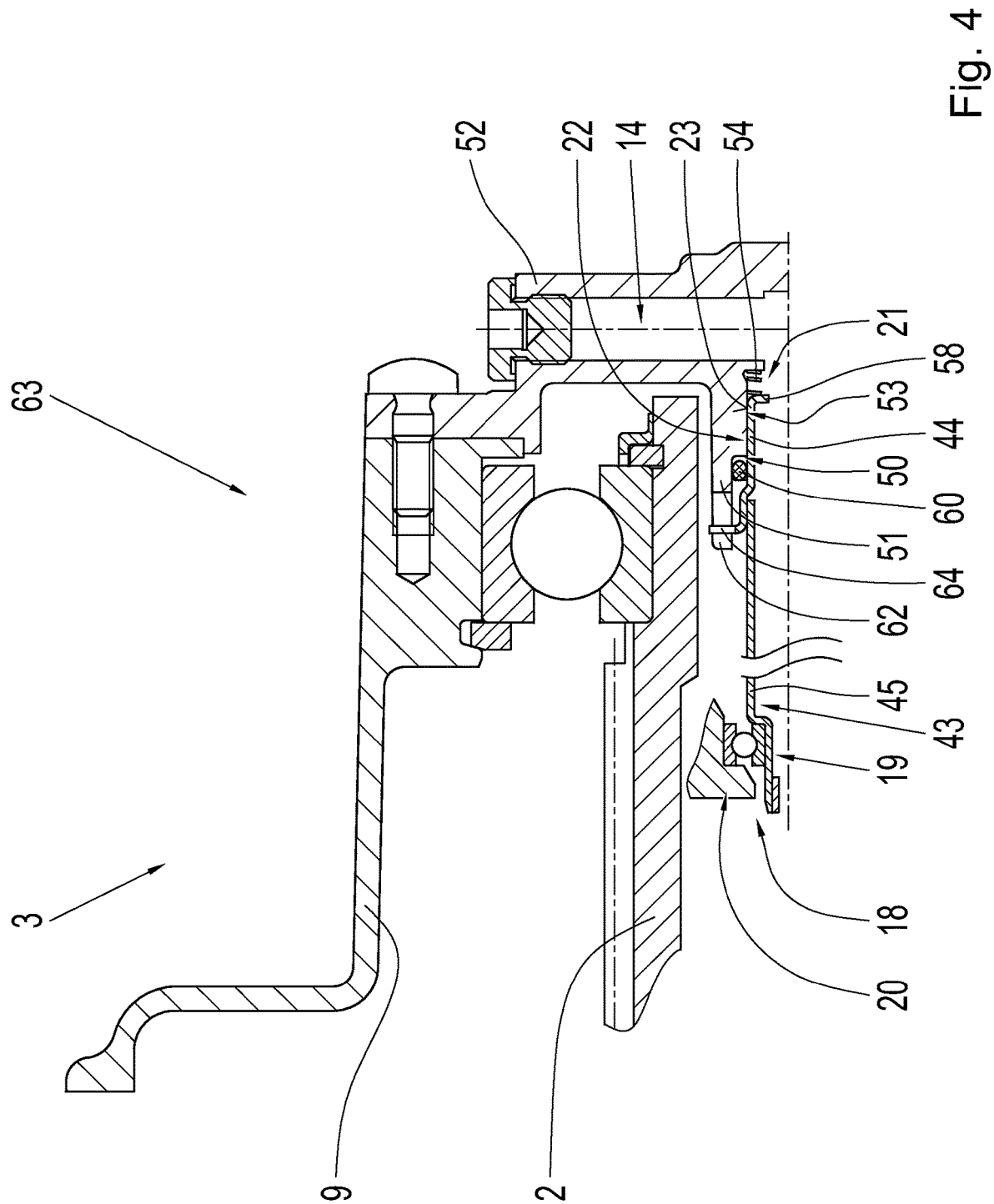
FIG. 4 shows a sectional view of an arrangement according to example aspects of the invention, according to a third example embodiment of the invention.

Furthermore, FIG. 4 shows a sectional view of an arrangement 63, which can also be used alternatively to the example variant from FIG. 2 for grounding the input shaft 2. This arrangement 63 is designed according to a third example embodiment of the invention. This example embodiment largely corresponds to the preceding example variant according to FIG. 3. In contrast to the example variant according to FIG. 3, a rotation prevention mechanism of the grounding hub 43 is provided via a ridge 64, which extends radially outward and is enclosed in the recess 62 on the housing cover 52 side. As a further difference, the O-ring 60 in this case is not inserted into a separately designed groove, but rather lies axially between the abutment shoulder 50 of the housing cover 52 and the projection 48 on the grounding hub 43. For the rest, the example embodiment according to FIG. 4 corresponds to the example variant according to FIG. 3, and so reference is made to the description thereof.

Figure 5:
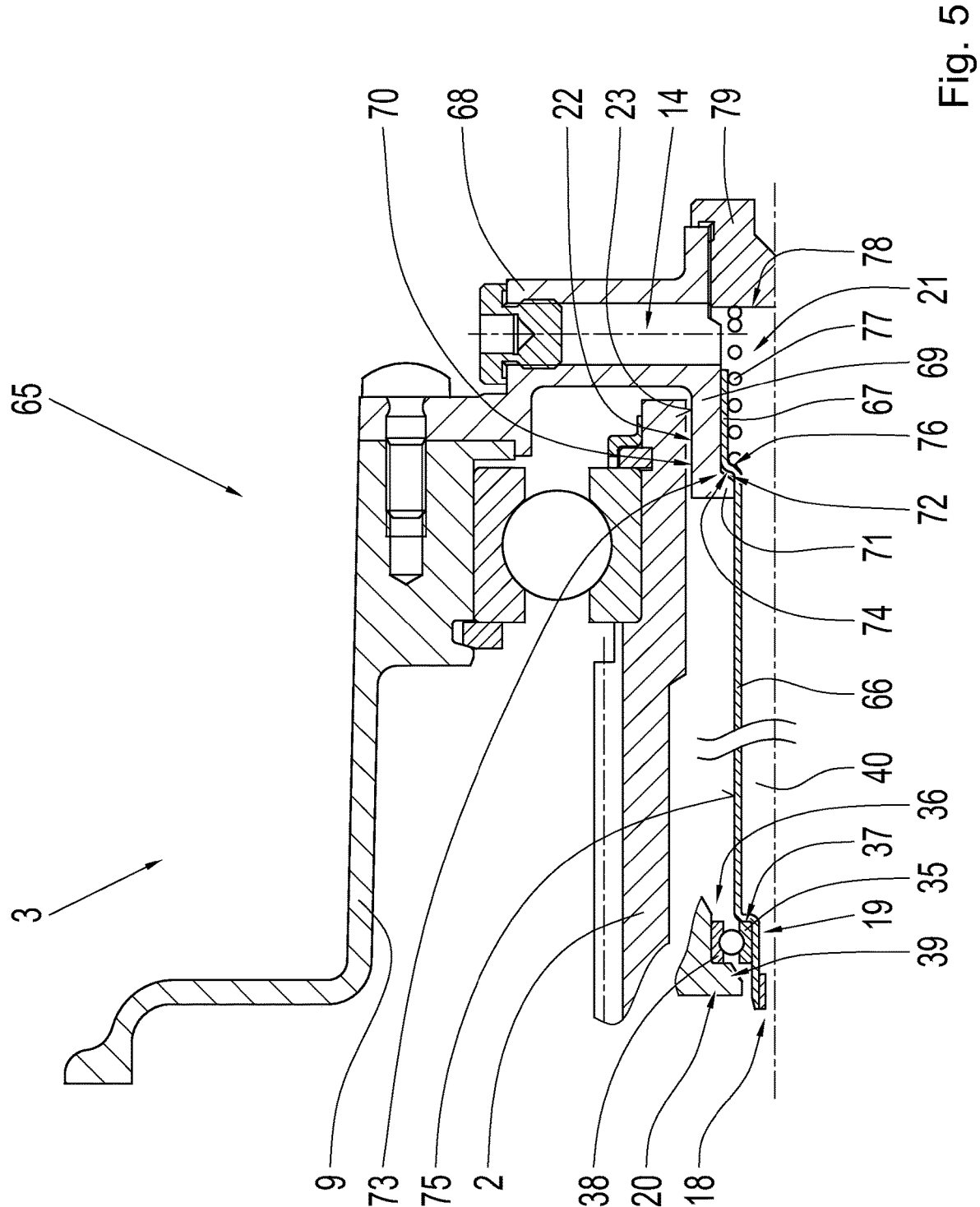
FIG. 5 shows a sectional view of an arrangement according to example aspects of the invention, according to a fourth example design option of the invention.

FIG. 5 furthermore shows a sectional view of an arrangement 65, which is realized according to a fourth example design option of the invention and can be used as an alternative to the example embodiment according to FIG. 2 for grounding the input shaft 2. This design option substantially corresponds to the example variant according to FIG. 2 and differs from the example embodiment according to FIG. 2 in that a grounding hub 66 has a section 67 on one axial end 21, which is circumferential and projects radially outward with respect to the rest of the grounding hub 66. On the outer diameter 23 of the section 67, a guide section 22 is formed for the axial guidance of the grounding hub 66 on a housing cover 68. Similarly to the example variant according to FIG. 2, the axial guidance of the grounding hub 66 on the housing cover 68 side takes place at a section 69, which is configured in the shape of a rod and has been inserted axially into the input shaft 2 radially inward with respect to the input shaft 2. A guide bore 70 for the axial guidance of the ground hub 66 is formed by the section 69.

As is apparent in FIG. 5, an abutment shoulder 72 is additionally defined by the section 69 on a radially inward projecting collar 71. The abutment shoulder 72, as an axial stop 73, limits an axial movement of the grounding hub 66 towards the bearing 19. On the grounding hub 66 side, an abutment surface 74 is formed for this purpose, the abutment surface 74 being formed on the axial end of the section 67 via a reduction of the outer diameter 23 onto an outer diameter 75.

On a radial inner side of the section 67, furthermore, an abutment surface 76 is formed via the reduction of the outer diameter 23 onto the outer diameter 75. A spring element 77 is supported against the abutment surface 76 on the grounding hub 66 side. This spring element 77 is in the form of a helical spring and axially preloads the grounding hub 66 towards the bearing 19. The spring element 77 also establishes electrically conductive contact of the grounding hub 66 with the housing cover 68 and thus also with the housing 9. On the housing cover 68 side, the spring element 77 is supported against an abutment surface 78. This abutment surface 78 is defined on the end face of a screw plug 79, which has been screwed into the housing cover 68 and establishes an electrically conductive connection of the spring element 77 with the housing cover 68. For the rest, the example embodiment according to FIG. 5 corresponds to the example variant according to FIG. 2, and so reference is made to the description thereof.

Figure 6:
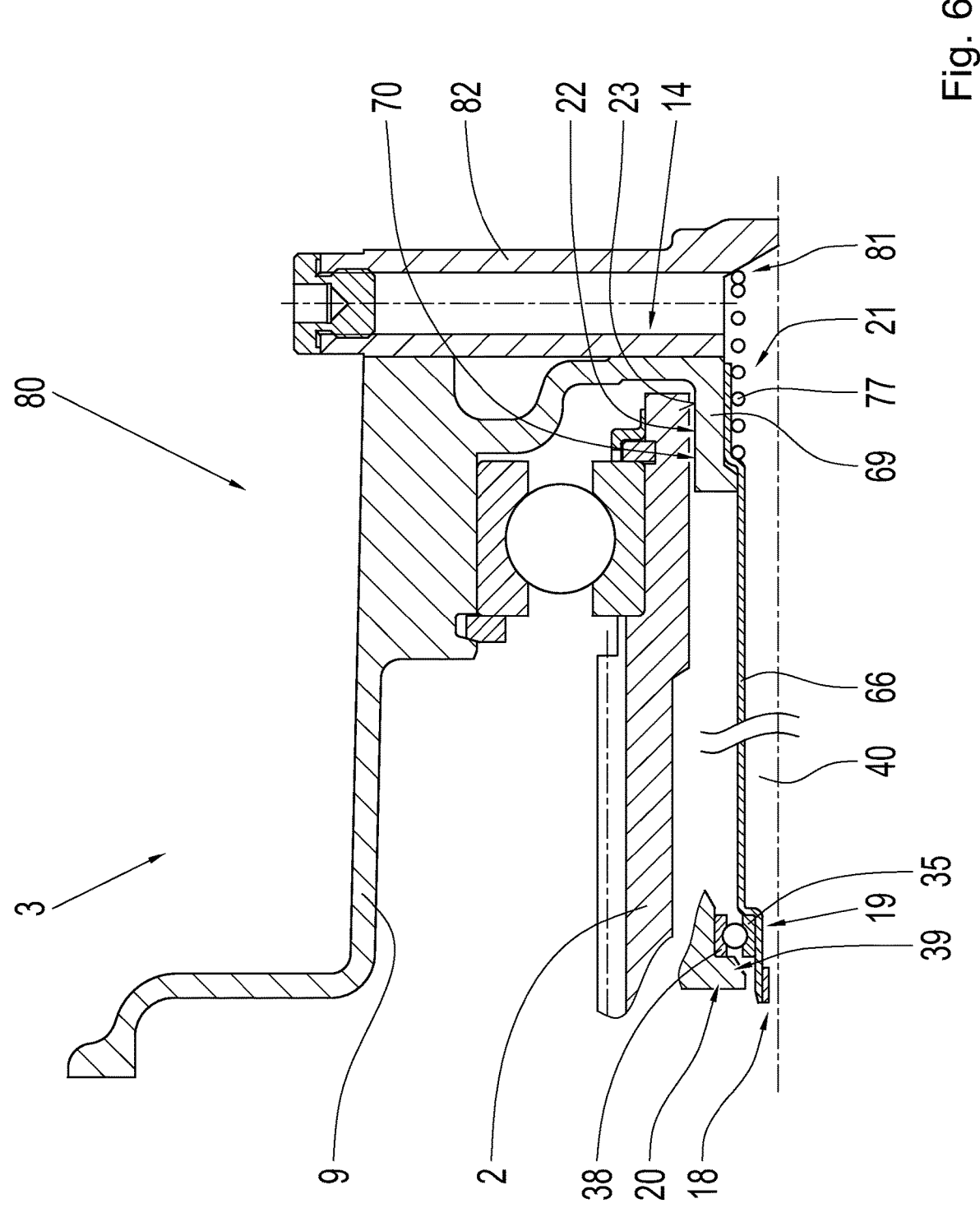
FIG. 6 shows a sectional view of an arrangement according to example aspects of the invention, according to a fifth example embodiment of the invention.

In addition, the arrangement 80 of FIG. 6 is realized according to a fifth example embodiment of the invention. In contrast to the preceding example variant according to FIG. 5, the section 69 and also the guide bore 70 for the axial guidance of the grounding hub 66 are now formed directly by the housing 9, which has been guided radially inward in this region for this purpose, axially surrounding the input shaft 2. An abutment surface 81 for the spring element 77 is then formed by a housing cover 82, which is fastened on the housing 9. For the rest, the example embodiment according to FIG. 6 corresponds to the example variant according to FIG. 5, and so reference is made to the description thereof.

Figure 7:
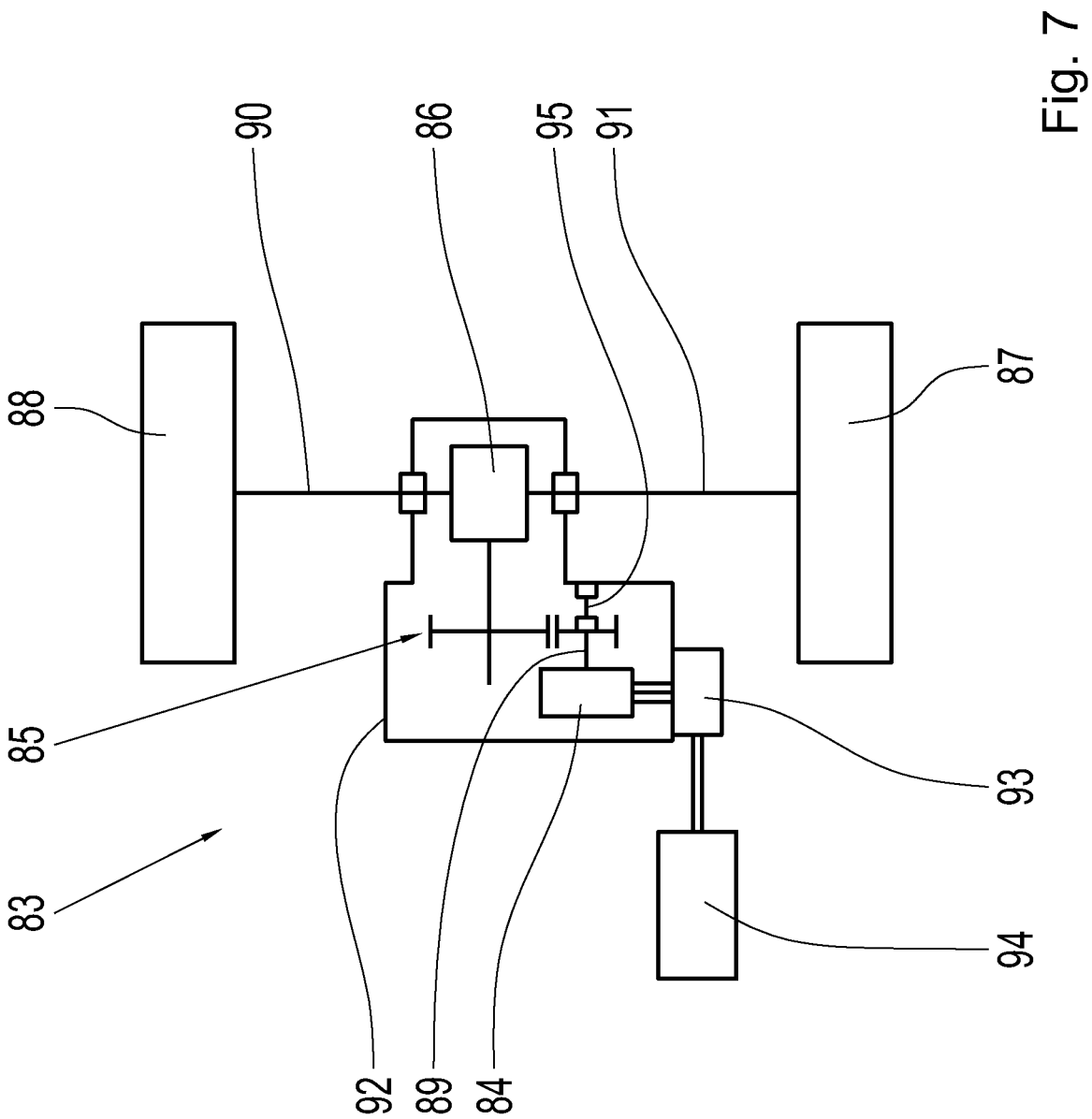
FIG. 7 shows a schematic view of a drive train of a motor vehicle.

FIG. 7 shows a schematic view of a drive train for a motor vehicle, which, in contrast to FIG. 1, is a purely electric drive train. The drive train includes an electric axle drive unit 83. The electric drive axle unit 83 includes an electric machine 84, the power of which is transmitted onto driving wheels 87 and 88 of a motor vehicle via a reduction gear set 85 and a differential gear 86. For this purpose, the electric machine is connected at its output end at a shaft 89 to the reduction gear set 85. Output shafts 90 and 91 of the differential gear 86 are connected to the driving wheels 87 and 88. The electric machine 84, the reduction gear set 85 and the differential gear 86 are enclosed in a housing 92. A power inverter 93 is mounted on the housing 92. The power inverter 93 is connected to the electric machine 84 on one side and to a battery 94 on the other side. The power inverter 93 is utilized for converting the direct current of the battery 94 into an alternating current, which is suitable for operating the electric machine 84, and includes several power semi-conductors for this purpose. The conversion between direct current and alternating current takes place by a pulse-like operation of the power semiconductors controlled by an open-loop system.

In the present case, a grounding of the shaft 89 is carried out within the framework of an arrangement according to example aspects of the invention, the arrangement being produced similarly to one of the example variants according to FIGS. 2 through 6. Thus, a grounding hub 95 is also provided here. Reference is made to FIGS. 2 through 6 for a more precise design of the arrangement for grounding the shaft 89 via the grounding hub 95.

Figure 8:
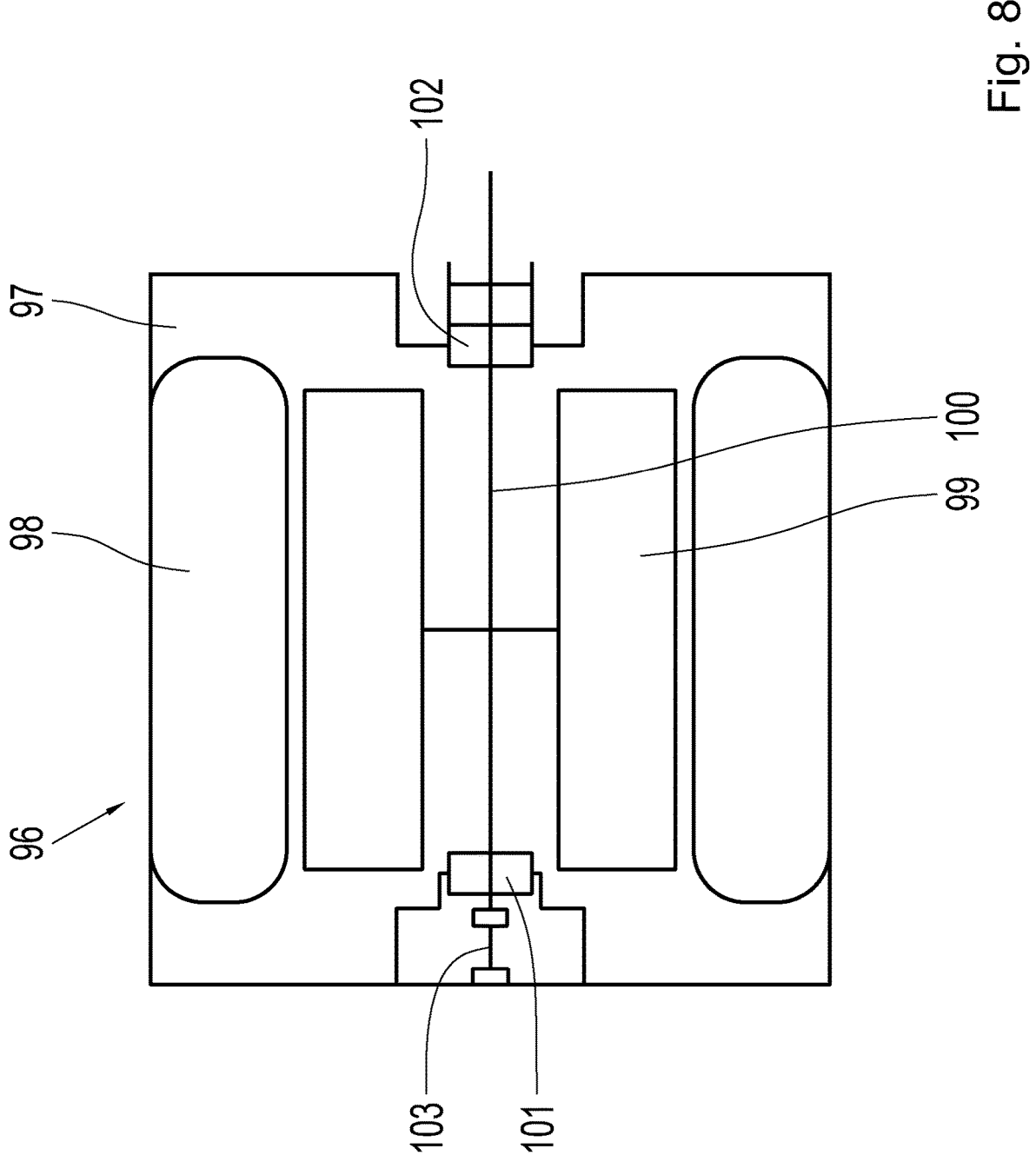
FIG. 8 shows a schematic view of an electric machine.

Finally, FIG. 8 shows a schematic view of an electric machine 96. The electric machine 96 has a housing 97, which accommodates a stator 98 and a rotor 99. The stator 98 is non-rotatably fixed in the housing 97. The rotor 99 is coupled to a rotor shaft 100. The rotor shaft 100 is rotatably mounted via two roller bearings 101 and 102, which are supported against the housing 97. One end of the rotor shaft 100 projects out of the housing 97.

In the present case, the rotor shaft 100 is grounded within the framework of an arrangement according to example aspects of the invention, the arrangement being produced similarly to one of the example variants according to FIGS. 2 through 6. Thus, a grounding hub 103 is also provided here. Reference is made to FIGS. 2 through 6 for a more precise design of the arrangement for grounding the rotor shaft 100. In particular, in the example embodiment shown in FIG. 8, the contact is formed in this case by a part of the rotor shaft, in order to establish a conductive connection to the grounding hub 103. Particularly preferably, the projection 39 shown in FIGS. 2 through 6 is arranged on the rotor shaft.

Reliable grounding of a shaft can be achieved in a compact manner by the embodiments of an arrangement according to the invention.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 internal combustion engine
2 input shaft
3 transmission
4 output shaft
5 differential gear
6 driving wheel
7 driving wheel
8 gear set
9 housing
10 electric machine
11 power inverter
12 battery
13 arrangement
14 axial end
15 bearing
16 grounding hub
17 housing cover
18 axial end
19 bearing
20 contact
21 axial end
22 guide section
23 outer diameter
24 inner diameter
25 guide bore
26 section
27 section
28 abutment surface
29 spring element
30 abutment shoulder
31 axial stop
32 axial stop
33 snap ring
34 groove
35 inner ring
36 diameter reduction
37 abutment shoulder
38 outer ring
39 projection
40 internal volume
41 supply connection
42 arrangement
43 grounding hub
44 first part
45 second part
46 outer diameter
47 connecting section
48 projection
49 abutment surface
50 abutment shoulder
51 section
52 housing cover
53 guide bore
54 spring element
55 abutment surface
56 collar
57 abutment surface
58 collar
59 groove 60 O-ring
61 ridge
62 recess
63 arrangement
64 ridge
65 arrangement
66 grounding hub
67 section
68 housing cover
69 section
70 guide bore
71 collar
72 abutment shoulder
73 axial stop
74 abutment surface
75 outer diameter
76 abutment surface
77 spring element
78 abutment surface
79 screw plug
80 arrangement
81 abutment surface
82 housing cover
83 axle drive unit
84 electric machine
85 reduction gear set
86 differential gear
87 driving wheel
88 driving wheel
89 shaft
90 output shaft
91 output shaft
92 housing
93 power inverter
94 battery
95 grounding hub
96 electric machine
97 housing
98 stator
99 rotor
100 rotor shaft
101 roller bearing
102 roller bearing
103 grounding hub

The invention claimed is:

1. An arrangement (13; 42; 63; 65; 80), comprising:
a shaft configured as a hollow shaft at least in the region of one axial end (14) of the shaft;
a ground forming a guide bore (25; 53; 70);
a grounding hub (16; 43; 66) via which the shaft is electrically conductively connected to the ground, the grounding hub (16; 43; 66) axially movably guided in the guide bore (25; 53; 70) of the ground; and
a spring element (29; 54; 77) that axially preloads the grounding hub (16:43; 66) towards a contact (20) at which the grounding hub (16; 43; 66) is electrically conductively connected to the shaft, the spring element (29; 54; 77) being supported on a ground side,
wherein the guide bore (25; 53; 70) is formed at a rod-shaped section (26; 51; 69), by which the ground is guided from the axial end (14) of the shaft radially inward and axially into the shaft, and
wherein the guide bore (25; 53; 70) axially overlaps the shaft.

2. The arrangement (13; 42; 63; 65; 80) of claim 1, wherein the spring element (29; 54; 77) electrically conductively connects the grounding hub (16; 43; 66) to the ground.

3. The arrangement (13; 42; 63; 65; 80) of claim 1, wherein the spring element (29; 54; 77) is supported against an abutment surface (28; 57; 76) on the grounding hub (16; 43; 66) side.

4. The arrangement (42; 63) of claim 3, wherein the abutment surface (57) is defined on an end face of the grounding hub (43) at one axial end (21) of the grounding hub (43).

5. The arrangement (13; 42; 63; 65; 80) of claim 1, wherein the grounding hub (16; 43; 66) comprises a radially outward projecting section (27; 47; 67) that, in interaction with a respective ground-side stop (31, 32; 73), is configured to limit axial displacement of the grounding hub (16; 43; 66) relative to the ground in at least one axial direction.

6. The arrangement (13; 65; 80) of claim 5, wherein:
the spring element (29; 54; 77) is supported against an abutment surface (28; 57; 76) on a grounding hub side; and
the radially outward projecting section (27; 67) forms the abutment surface (28; 76) for the contact with the spring element (29; 77).

7. The arrangement (13; 42; 63; 65; 80) of claim 5, wherein the respective ground-side stop (31, 32; 73) is formed by one or both of an abutment shoulder (30; 50; 72) and a snap ring (33) accommodated in a groove (34) on the ground side.

8. The arrangement (42; 63) of claim 1, wherein:
the grounding hub (43) is secured against rotation on the ground side by at least one ridge (61; 64) that projects radially and extends in a circumferential direction over a subsection,
the at least one ridge (61; 64) is formed on the grounding hub (43) or on the ground; and
each of the at least one ridge (61; 64) projects into a respective recess (62), each recess delimited on both sides of the ridge (61; 64) in the circumferential direction and formed on the ground or on the grounding hub.

9. The arrangement (42; 63) of claim 1, wherein:
the grounding hub (43) is configured as a multi-part design;
the grounding hub (43) is axially guided by a first part (44) of the grounding hub (43) that is electrically conductively connected to the ground and is connected to a second part (45) of the grounding hub (43),
the second part (45) of the grounding hub (43) is configured to electrically conductively connect the first part (44) with the shaft (89).

10. The arrangement (42; 63) of claim 9, wherein:
the grounding hub (43) is secured against rotation on the ground side by at least one ridge (61; 64) that projects radially and extends in a circumferential direction over a subsection,
the at least one ridge (61; 64) is formed on the grounding hub (43) or on the ground;
each of the at least one ridge (61; 64) projects into a respective recess (62), each recess delimited on both sides of the ridge (61; 64) in the circumferential direction and formed on the ground or on the grounding hub; and
the at least one ridge (61; 64) projects radially outward on the first part (44) of the grounding hub (43).

11. The arrangement (42; 63) of claim 1, further comprising an elastomeric element accommodated on the rod-shaped section (51) and contacting the grounding hub (43).

12. The arrangement (13; 42; 63; 65; 80) of claim 1, wherein the grounding hub (16; 43; 66) is tubular at least in sections and, via an internal volume (40), connects a supply connection (41) for lubricant and/or coolant on the ground side to the shaft.

13. The arrangement (13; 42; 63; 65; 80) of claim 1, wherein the grounding hub (16; 43; 66) has a diameter reduction (36) on which a bearing (19) having an inner ring (35) is disposed.

14. The arrangement (13; 42; 63; 65; 80) of claim 13, wherein the bearing (19) forms the contact (20) via which the grounding hub (16; 43; 66) is electrically conductively connected to the shaft.

15. The arrangement (13; 42; 63; 65) of claim 1, wherein the rod-shaped section (26; 51; 69) is formed on a housing cover (17; 52; 68) attached to a housing (9) that forms the ground.

16. A transmission (3), comprising the shaft grounded with the arrangement of claim 1.

17. An electric drive axle unit (83) for a motor vehicle, comprising the shaft grounded with the arrangement of claim 1.

18. An electric machine (96), comprising:
a rotationally fixed stator (98);
a rotary rotor (99), the rotor (99) coupled to a rotor shaft (100),
wherein the rotor shaft (100) is the shaft grounded with the arrangement of claim 1.

19. An arrangement (13; 42; 63; 65; 80), comprising:
a shaft configured as a hollow shaft at least in the region of one axial end (14) of the shaft;
a ground forming a guide bore (25; 53; 70); and
a grounding hub (16; 43; 66) via which the shaft is electrically conductively connected to the ground, the grounding hub (16; 43; 66) axially movably guided in the guide bore (25; 53; 70) of the ground, the grounding hub (16; 43; 66) comprising a radially outward projecting section (27; 47; 67),
wherein the guide bore (25; 53; 70) is formed at a rod-shaped section (26; 51; 69), by which the ground is guided from the axial end (14) of the shaft radially inward and axially into the shaft,
wherein the guide bore (25; 53; 70) axially overlaps the shaft, and
wherein the radially outward projecting section (27; 47; 67), in interaction with a respective ground-side stop (31, 32; 73), is configured to limit axial displacement of the grounding hub (16; 43; 66) relative to the ground in at least one axial direction.

20. An arrangement (13; 42; 63; 65; 80), comprising:
a shaft configured as a hollow shaft at least in the region of one axial end (14) of the shaft;
a ground forming a guide bore (25; 53; 70); and
a grounding hub (16; 43; 66) via which the shaft is electrically conductively connected to the ground, the grounding hub (16; 43; 66) axially movably guided in the guide bore (25; 53; 70) of the ground,
wherein the guide bore (25; 53; 70) is formed at a rod-shaped section (26; 51; 69), by which the ground is guided from the axial end (14) of the shaft radially inward and axially into the shaft,
wherein the guide bore (25; 53; 70) axially overlaps the shaft, and
wherein:
the grounding hub (43) is secured against rotation on the ground side by at least one ridge (61; 64) that projects radially and extends in a circumferential direction over a subsection,
the at least one ridge (61; 64) is formed on the grounding hub (43) or on the ground; and
each of the at least one ridge (61; 64) projects into a respective recess (62), each recess delimited on both sides of the ridge (61; 64) in the circumferential direction and formed on the ground or on the grounding hub.

\* \* \* \* \*